US005305025A

United States Patent [19]

White et al.

[11] Patent Number: 5,305,025

[45] Date of Patent: Apr. 19, 1994

[54] ELASTICA COUNTER ELECTRODE FOR AN ELECTROSTATIC RECORDER

[75] Inventors: Stephen D. White, Santa Clara; Keith E. McFarland, Woodside; Lorin K. Hansen, Fremont, all of Calif.

[73] Assignee: Xerox Corporation, Stamford, Conn.

[21] Appl. No.: 888,692

[22] Filed: May 21, 1992

[51] Int. Cl.[5] ............ G01D 15/06

[52] U.S. Cl. ............ 346/155

[58] Field of Search ............ 346/155

[56] References Cited

U.S. PATENT DOCUMENTS

| | | | |
|---|---|---|---|
| 3,626,422 | 12/1971 | Lloyd | 346/155 |
| 3,693,181 | 9/1972 | Marshall et al. | 346/155 |
| 4,308,548 | 12/1981 | Harkmans et al. | 346/155 |
| 4,315,270 | 2/1982 | Lloyd et al. | 346/155 |
| 4,424,522 | 1/1984 | Lloyd et al. | 346/154 |
| 4,459,603 | 7/1984 | Kimoto | 346/155 |
| 4,799,070 | 1/1989 | Nishikawa | 346/159 |
| 5,150,134 | 9/1992 | Hansen et al. | 346/155 |

*Primary Examiner*—Benjamin R. Fuller
*Assistant Examiner*—Randy W. Gibson

[57] ABSTRACT

An improved counter electrode assembly for an electrostatic recorder in which the recorder applies electrical charges, in image configuration, upon a movable image recording member by means of a stylus electrode array and a counter electrode assembly aligned with one another and between which the image recording member may be moved. Both the stylus electrode array and the counter electrode assembly are positioned so as to extend transversely to the direction of movement of the image recording member. The counter electrode assembly comprises a support member, an elastica sheet member anchored to the support member and bowed toward the stylus electrode array, and an electrically resistive member urged by the elastica sheet toward the stylus electrode array.

13 Claims, 4 Drawing Sheets

ELASTICA COUNTER ELECTRODE FOR AN ELECTROSTATIC RECORDER

FIELD OF THE INVENTION

This invention relates to electrostatic recorders including a recording medium which is transported past a charging region located between recording electrodes and counter electrodes in the form of backplates. More particularly, this invention relates to a low cost, easily constructed, improved continuous counter electrode structure having an advantageous contact pressure distribution.

BACKGROUND OF THE INVENTION

Electrostatic printing upon an image recording medium comprises the formation of a latent, electrostatic image by the selective creation of air ions and the deposition of those ions of a given sign (usually negative) at selected pixel locations on the recording medium. The aggregate of the charged pixel areas forms an electrostatic latent (i.e. non-visible) image which is subsequently made visible at a development station. Development may be accomplished by passing of the recording medium, bearing the latent image, into contact with a liquid solution containing positively charged dye particles in colloidal suspension. The dye particles will be attracted to the negatively charged imaging ions so as to render the image visible. The visual density of the image thus developed will be a function of the potential or charge density of the electrostatic image.

Two types of image recording media in common usage are paper and film. The paper is specially treated so that its bulk will be electrically conductive and is overcoated with a thin dielectric coating on its image bearing side. The film comprises a dielectric substrate (such as Mylar®) overcoated with a very thin, semi-transparent intermediate conductive layer and a surface dielectric layer upon its image bearing side. To write on the media, electrical contact must be made to bleed off electrical charge. For film, electrical contact is made by conductive stripes painted near the edges of the media which penetrate the dielectric layer to make electrical contact with the conductive inner layer of the media. When writing on paper media, electrical contact is made directly to the backside of the paper. The backplate portion of the writing potential is established in the paper conductive layer by direct contact thereof with the conductive counter electrodes, that is, by essentially resistive coupling. When writing on film, the backplate portion of the writing potential is established in the intermediate conductive layer by capacitive coupling, through the Mylar substrate, between the intermediate conductive layer and the counter electrodes.

Conventionally, an electrostatic image may be formed upon the thin surface dielectric layer of a paper recording medium by passing the recording medium between a recording head, including an array of recording stylus electrodes, and a counter electrode comprising an array of complementary counter electrode segments. A charge is applied to selected pixel locations on the recording medium by the coincidence of voltage pulses applied to opposite surfaces thereof, by the stylus electrodes and the counter electrodes. When the potential difference between the stylus electrodes and the conductive layer of the recording medium is large enough to cause the voltage in the air gap between the stylus electrodes and the surface of the dielectric layer to exceed the breakdown threshold of the air, the air gap becomes ionized and air ions, of the opposite sign to the potential of the conductive layer, are attracted to the surface of the dielectric layer. As the dielectric surface charges up, the voltage across the gap will decrease to a value below the maintenance voltage of the discharge. At that time, the discharge extinguishes, leaving the dielectric surface charged. A potential difference of about 600 volts (about 800 volts for film) is required to establish a discharge. Of that threshold potential, about −200 volts is imposed on the stylus electrodes contemporaneous with the application of about +400 volts (+600 volts for film) on the counter electrodes.

Electrostatic recorders may be typically from 11 inches to 44 inches wide, and in some cases even as wide as 72 inches. Therefore, the writing head stylus array which extends fully across this width may have as many as 2000 to over 17,000 styli (at resolutions of 200 to 400 dots per inch). Because of this very large number of styli it is ordinarily not economically attractive to use a single driver per stylus, and a multiplexing arrangement is commonly used in conjunction with the above-described electrostatic discharge method. The styli in the writing head array are divided into stylus electrode groups (each group being about 0.64 inch to 2.56 inches long) so that each may consist of several hundred styli. The stylus electrodes are wired in parallel with like numbered styli in each group being connected to a single driver and carrying the same information. Writing will only occur in the stylus group whose complementary counter electrode is pulsed.

In U.S. Pat. No. 4,424,522 (Lloyd et al) entitled "Capacitive Electrostatic Stylus Writing With Counter Electrodes" there is disclosed a backplate electrode assembly which is conformable to the arcuate crown of the recording head. A structure of this type is illustrated in FIGS. 1 and 2, and is more fully described below. It comprises a plurality of segments of an electrically resistive material mounted upon an elongated, U-shaped, support bar so as to be electrically independent. The segments are anchored to the support bar and are stretched over the channel thereof within which is provided a resilient member for urging the surface of the resistive material into intimate contact with the recording medium. In its commercial application, in electrostatic printer/plotters manufactured by the assignee of the present patent application, the resilient member comprises a strip of foam and an oil-filled bladder for urging the segmented backplate electrodes toward the writing head.

The complexity of the biasing elements of the backplate electrode structure described above increases the cost of manufacture. Furthermore, uniform wrapping tension of each segment upon the support bar is difficult to achieve, and insufficient tension can result in curling of the segment edges which allows debris and chaff to collect in the gaps and thus provide a shorting path. Non-uniform tension along the writing line can also cause image intensity variations across the plot and wear variations across the writing head which result in image striations, i.e. visible striping on the printed image extending in the direction of movement of the recording medium. As the pressure applied by the biasing elements against the recording head increases, so does the likelihood of flaring because flare writing increases with pressure as the media's surface abrades the ends of the styli. Flaring is a phenomenon caused by non-uniform electrical discharge which results in non-uniform electrostatic image spots being created on the recording medium.

Therefore, the objects of the present invention are to overcome these shortcomings by providing a counter electrode in which the biasing element, for urging the electrically conductive material against the recording head, is of simple and inexpensive construction and will conform to the shape of the recording head. Furthermore, it would be desirable if the counter electrode could provide a non-uniform contact pressure sufficient to conform the media to the recording head surface with a minimum force being applied along the nib line.

SUMMARY OF THE INVENTION

These and other objects may be obtained, in one form, by providing an improved counter electrode assembly for an electrostatic recorder. The recorder applies electrical charges, in image configuration, upon a movable image recording member by means of a stylus electrode array and a counter electrode assembly aligned with one another and between which the image recording member may be moved. Both the stylus electrode array and the counter electrode assembly are positioned so as to extend transversely to the direction of movement of the image recording member. The counter electrode assembly comprises a support member, an elastica sheet member anchored to the support member and bowed toward the stylus electrode array, and an electrically resistive member urged by the elastica sheet toward the stylus electrode array.

BRIEF DESCRIPTION OF THE DRAWINGS

Other objects and further features and advantages of this invention will be apparent from the following, more particular, description considered together with the accompanying drawings, wherein.

DETAILED DESCRIPTION OF THE INVENTION

Figure 1:
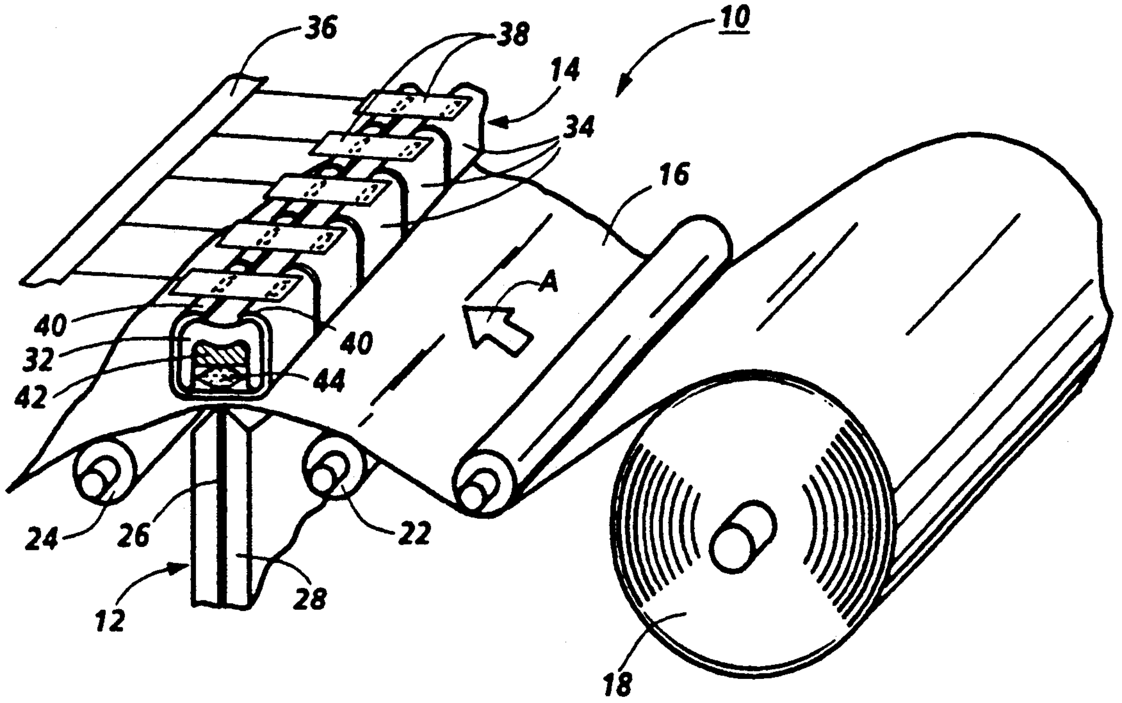
Fig. 1 (Prior Art)
FIG. 1 is a perspective view of a known charging station for an electrostatic recorder having writing styli and counter electrodes disposed on opposite sides of an image recording medium.
Figure 2:
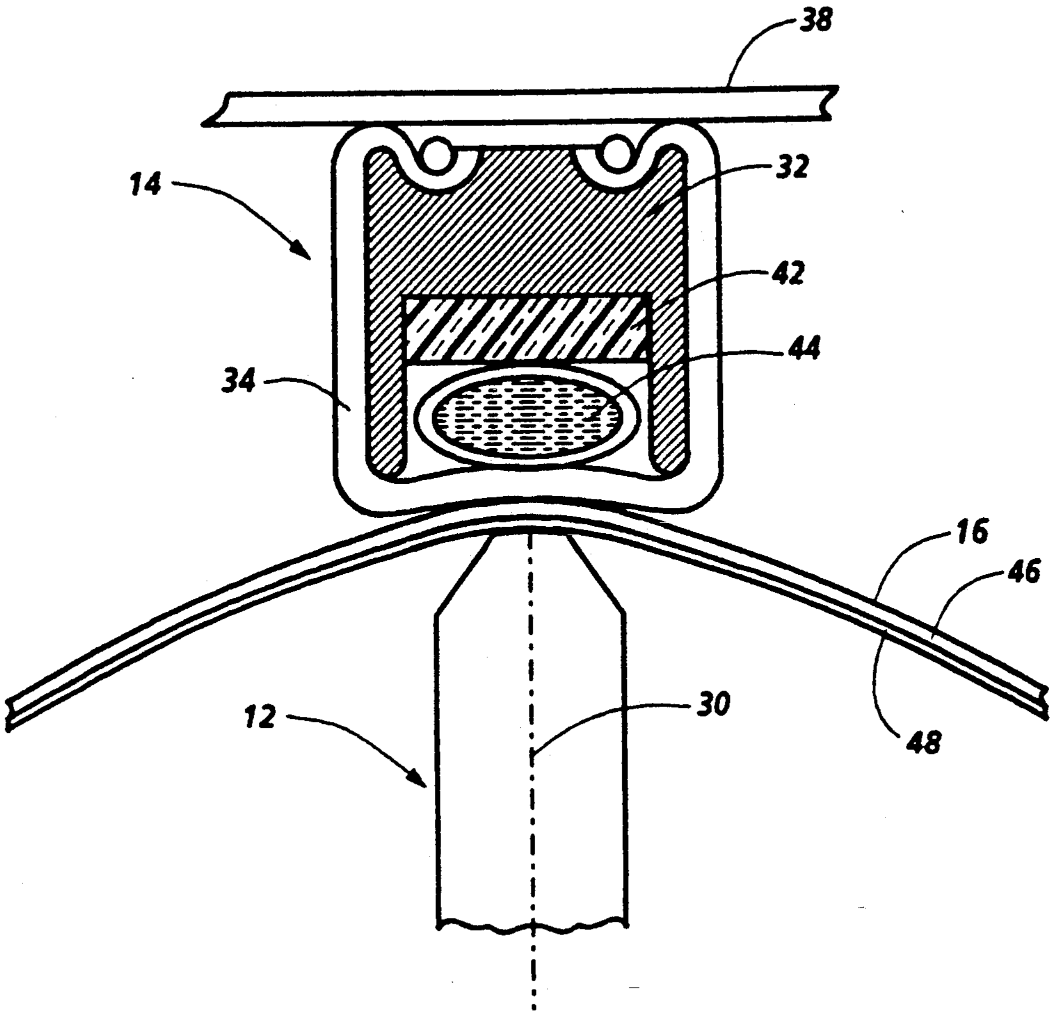
Fig. 2 (Prior Art)
FIG. 2 is an enlarged sectional view of the counter electrode shown in FIG. 1, FIGS. 3 and 4 are sectional views of two embodiments of the counter electrode structure in accordance with the present invention, wherein the resistive electrode member is secured to an elastica sheet.

Turning now to the drawings, there is illustrated in FIGS. 1 and 2 the relevant image forming elements of a known electrostatic stylus recorder 10. It includes a writing head 12 and a cooperating, conformable counter electrode 14 for depositing a latent electrostatic image on the dielectric surface coating of a web-like image recording medium 16. The recording medium is provided on a supply spool 18 and is advanced in the direction of the arrow A to pass between the writing head 12 and the counter electrodes 14. An appropriate tension force is applied to ensure that the web 16 is advanced at a controlled rate. Guide rollers 22 and 24 cause the web 16 to wrap over the crown of the writing head 12 at a suitable wrap angle. The writing head 12 comprises a linear array of conductive styli, or nibs, 26 embedded within insulating support member 28 along a central elongated nib line (indicated by a central phantom line 30 in subsequent Figures). Nib drivers pulse the styli at appropriate voltages in a timed manner, in accordance with the information to be printed. It should be understood that there may be more than one such linear styli arrays displaced from one another in the direction of web movement, with each of the styli of one array being laterally offset from each of the styli of the other arrays, usually by one half the inter-styli spacing, in order to obtain full density printing.

The known counter electrodes 14 most commonly comprise an insulating U-shaped support bar 32 upon which are mounted resistive electrode segments 34. The segments are cut from a composite sheet formed from a Dacron gauze, or other like material, with a carbon loaded polymer mixture pressed into both of its surfaces. The sheet is about 5–10 mils thick and has the desired characteristics of strength and lubricity, and has a resistivity in the range 90–150 kΩ/square. Great care must be taken during mounting to accurately space the segments 34 from one another by a minimal distance (to reduce striations) and yet to prevent electrical contact therebetween. Counter electrode drivers 36 are in electrical contact with the electrode segments 32 by contact pads 38 formed on a printed circuit board (not shown) which overlie the ends 40 of each electrode segment 34. The electrode segment is a flaccid, clothlike material. A central portion of each electrode segment overlies the open mouth of the support bar 32 and is maintained in conforming contact with the writing head 12 by an outward (relative to the support bar) force applied to its back side by the resilient foam member 42 and the fluid filled bladder 44.

A non-segmented resistive counter electrode, extending the entire length of the writing head is described in a copending patent application assigned to the same assignee as the instant application. It bears U.S. Ser. No. 07/706,708, is entitled "Counter Electrode for an Electrostatic Recorder" (Hansen et al) and is hereby fully incorporated by reference. It comprises a substrate upon which are supported a plurality of electrically conductive traces each extending substantially in the process direction. The traces are interconnected by a layer of resistive material. Electrical potentials are applied to spaced regions of the counter electrode trace array via contact pads connected to periodically spaced traces.

The purpose of the counter electrode structure is two-fold, first it provides the electrical bias to be coupled to the conductive bulk of the paper media or the conductive layer of the film media and, second it provides the outward force to conform the media to the recording head. We have invented a unique counter electrode structure which will accomplish these purposes in a more simple and less expensive manner than has heretofore been available. Our structure relies on sheets of elastica. By the term elastica we mean elastic material which undergoes large deflections. Elasticity is the property of a body, when deflected, to automatically recover its normal configuration as the deflecting forces are removed. For elastic elements undergoing small deflections, the deflection is proportional to the deflecting force. This linear response does not exist for the elastica.

Figure 3:
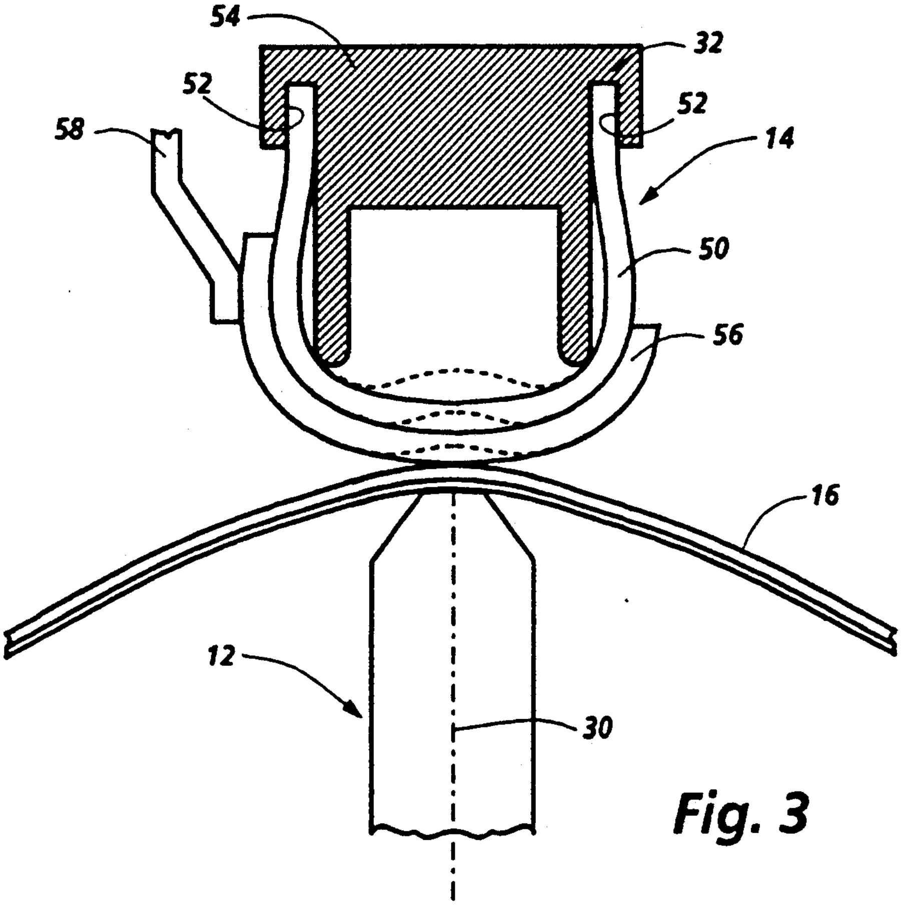

One form of the improved counter electrode structure of the present invention is shown in FIG. 3 wherein the ends of an elastica sheet 50 are anchored in recesses 52 in the support bar 54 and segments 56 of the resistive electrode are laminated, or otherwise secured thereto. Elastica sheet 50 may be about 2 to 5 mils thick and made of Mylar ®, Kapton ® or some similar material which will have comparably elastic and insulative properties. Alternatively, spaced regions of a resistive polymer ink or paint may be applied directly to the substrate. Electrical contact may be made with the resistive electrodes by contact pads 58. By securing the resistive segments directly to the elastica sheet 50, they may be very closely spaced yet be prevented from touching or shorting. This simplifies close-tolerance manufacture. The free surface of the elastica sheet bows away from the support bar 54 and, when urged against the writing head 12, will provide the necessary force required to deform into conformity with the surface of the writing head and to hold the recording medium firmly thereagainst.

Increasing the force of the writing head against the elastica sheet, beyond a threshold amount, will increase its deflection and will cause its center to buckle away from the head (as shown in dotted lines). This would be an unsatisfactory mode of usage because the recording medium would be unsupported over the nib line. However, we believe that an optimum mode of usage would result from a sub-threshold writing head force of a magnitude sufficient to off-load the nib line, but insufficient to buckle away from it. In this manner, the recording medium will be held in contact with the recording head but there will be very little pressure over the nib line and less abrasion of the styli ends.

Figure 4:
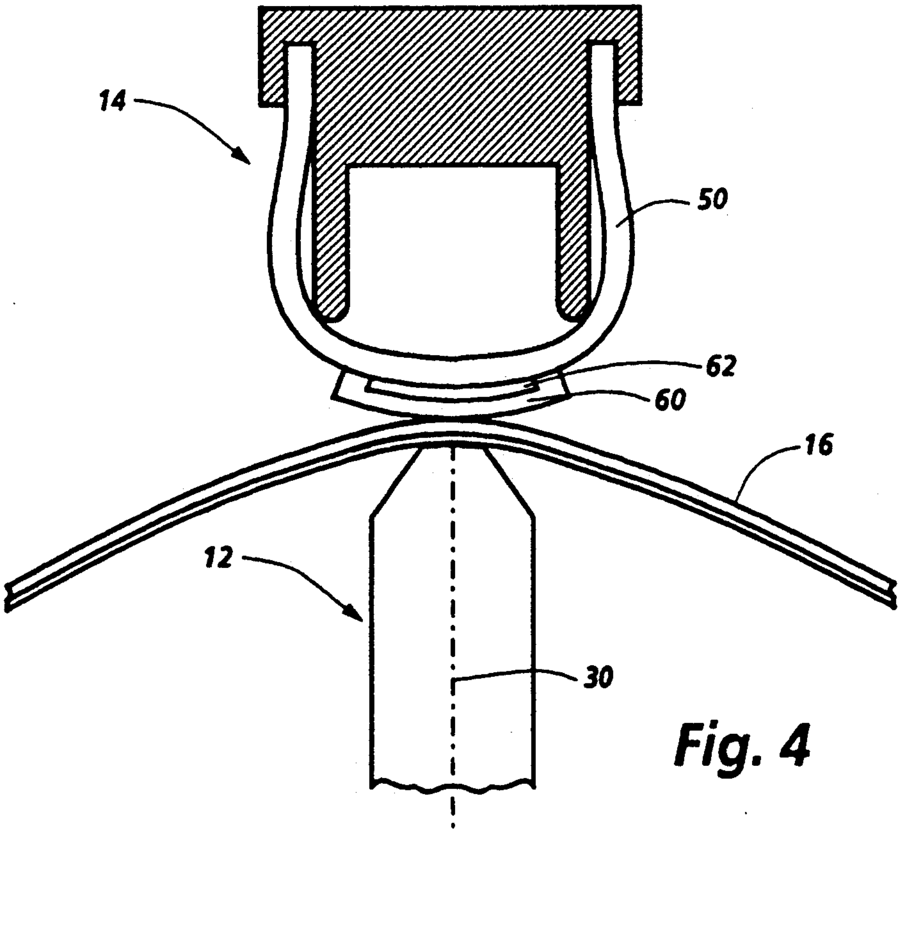

An alternative to the segmented resistive material is illustrated in FIG. 4. It shows in a narrow stripe 60 of a continuous length of resistive material having conductive traces 62 embedded therein, (as disclosed in copending application U.S. Ser. No. 07/706,708) laminated over the center of the elastica sheet 50. This continuous structure may also be formed directly upon the elastica sheet by first depositing the traces (e.g. sputtering copper or painting with a conductive ink) thereupon and then overcoating with a resistive material.

Figure 5:
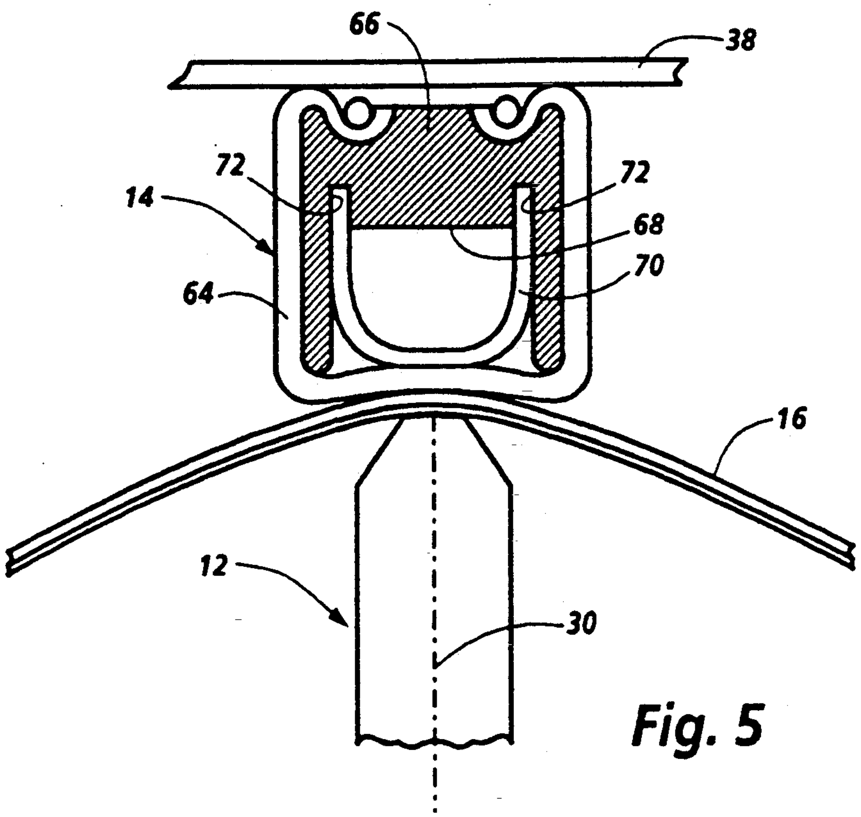
FIGS. 5 and 6 are sectional view of two further embodiments of the counter electrode structure in accordance with the present invention, wherein an elastica sheet urges the conventional resistive electrode member outwardly.
Figure 6:
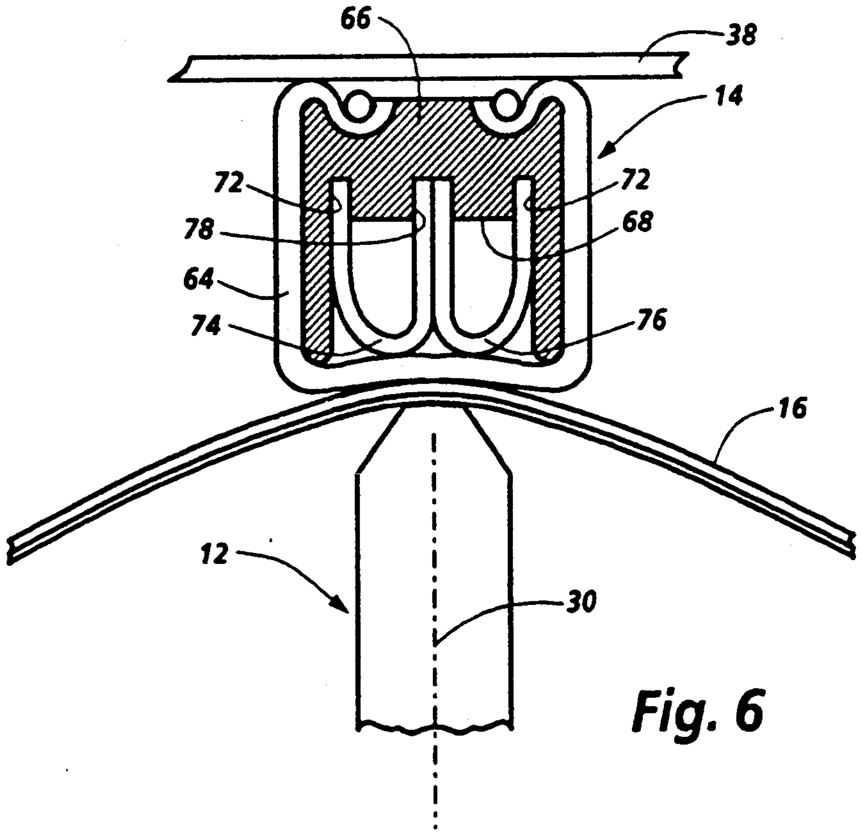

In the embodiment of our invention illustrated in FIGS. 5 and 6, the resistive material 64 may be the conventional flaccid material described with regard to FIG. 2. Therefore, it is necessary to provide a force applying member for urging the resistive material against the recording medium. As illustrated, a novel force applying member is positioned within the channel 66 of the U-shaped support bar 68. Our significantly cost reduced and easily manufactured counter electrode utilizes, in FIG. 5, a single elastica sheet 70 anchored in slots 72 in the support bar. In FIG. 6 there is shown a configuration with a pair of elastica sheets 74 and 76 anchored in slots 72 and 78. In each case, the spring action of the bowed elastica sheet urges the resistive material toward the writing head.

However, in the FIG. 6 embodiment, there will be a reliable off-loading of the nib line. Alternatively, the force applying member may be located at the exterior of the support bar 68, in a manner similar to that illustrated in the FIGS. 3 and 4 embodiments.

It should be understood that numerous changes in details of construction and the combination and arrangement of elements and materials may be resorted to without departing from the true spirit and scope of the invention as hereinafter claimed.

What is claimed:

1. In an electrostatic recorder for applying electrical charges, in image configuration, upon a movable image recording member, said recorder including a stylus electrode array and a counter electrode assembly being aligned with one another, and urged together, and between which an image recording member may be moved, and being positioned so as to extend transversely to a direction of movement of an image recording member, said counter electrode assembly comprising a support member, elastica sheet anchored to said support member and bowed away therefrom toward said image recording member and said stylus electrode array, said bowed portion of said elastica sheet being deflected in a non-linear manner in response to a load imposed upon said sheet by said stylus electrode array, and an electrically resistive member urged by said elastica sheet toward said image recording member and said stylus electrode array.

2. The electrostatic recorder as defined in claim 1 wherein said elastica sheet is electrically insulating and said electrically resistive member is an array of segments disposed on said elastica sheet.

3. The electrostatic recorder as defined in claim 2 wherein said electrically resistive member is secured to said elastica sheet.

4. The electrostatic recorder as defined in claim 3 wherein said elastica sheet with said electrically resistive member thereon provides a greater bias force to portions of said image recording member outboard of a central portion thereof than said elastica sheet provides at said central portion.

5. The electrostatic recorder as defined in claim 2 wherein said electrically resistive member is formed integrally with said elastica sheet.

6. The electrostatic recorder as defined in claim 5 wherein said elastica sheet with said electrically resistive member thereon provides a greater bias force to portions of said image recording member outboard of a central portion thereof than said elastica sheet provides at said central portion.

7. The electrostatic recorder as defined in claim 1 wherein said elastica sheet is electrically insulating and said electrically resistive member is a continuous strip disposed on said elastica sheet.

8. The electrostatic recorder as defined in claim 7 wherein said electrically resistive member is secured to said elastica sheet.

9. The electrostatic recorder as defined in claim 7 wherein said electrically resistive member is formed integrally with said elastica sheet.

10. The electrostatic recorder as defined in claim 8 wherein said elastica sheet with said electrically resistive member thereon provides a greater bias force to portions of said image recording member outboard of a central portion thereof than said elastica sheet provides at said central portion.

11. The electrostatic recorder as defined in claim 9 wherein said elastica sheet with said electrically resistive member thereon provides a greater bias force to portions of said image recording member outboard of a central portion thereof than said elastica sheet provides at said central portion.

12. The electrostatic recorder as defined in claim 1 wherein said elastica sheet provides a greater bias force to portions of said image recording member outboard of a central portion thereof than said elastica sheet provides at said central portion.

13. The electrostatic recorder as defined in claim 1 wherein said electrically resistive member is anchored to said support member and said elastica sheet comprises two bowed elastica sheets which abut at a central portion of said support member.

* * * * *